United States Patent
Liang et al.

(10) Patent No.: US 8,229,391 B2
(45) Date of Patent: Jul. 24, 2012

(54) METHOD, APPARATUS AND SYSTEM FOR MANAGING EMERGENCY SERVICES OF MOBILITY-RESTRICTED MOBILE STATION

(75) Inventors: Wenliang Liang, Shanghai (CN); Lei Lu, Shanghai (CN); Bojie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/114,406

(22) Filed: May 24, 2011

(65) Prior Publication Data

US 2011/0281548 A1    Nov. 17, 2011

Related U.S. Application Data

(63) Continuation of application No. PCT/CN2009/074924, filed on Nov. 17, 2009.

(30) Foreign Application Priority Data

Nov. 26, 2008    (CN) .......................... 2008 1 0217683

(51) Int. Cl.
*H04M 11/04* (2006.01)
(52) U.S. Cl. ..................... 455/404.1; 455/450; 455/464; 370/329
(58) Field of Classification Search ............. 455/404.1, 455/410, 414.1, 450, 464, 509; 370/328–329, 370/341, 348
See application file for complete search history.

(56) References Cited

U.S. PATENT DOCUMENTS

| | | | | |
|---|---|---|---|---|
| 6,041,047 | A * | 3/2000 | Diachina et al. .............. | 370/347 |
| 7,447,765 | B2 * | 11/2008 | Aerrabotu et al. ............ | 709/224 |
| 2002/0002041 | A1 * | 1/2002 | Lindgren et al. .............. | 455/404 |
| 2005/0043008 | A1 * | 2/2005 | Hurita ......................... | 455/404.1 |
| 2006/0030290 | A1 * | 2/2006 | Rudolf et al. ............... | 455/404.1 |
| 2006/0258354 | A1 | 11/2006 | ul Haq | |
| 2007/0060097 | A1 * | 3/2007 | Edge et al. ................. | 455/404.1 |

(Continued)

FOREIGN PATENT DOCUMENTS

CN            101014004            8/2007

(Continued)

OTHER PUBLICATIONS

*Mobility Restriction*, Nortel, WiMax Forum, Apr. 24, 2008 (17 pp.).

(Continued)

*Primary Examiner* — Kent Chang
*Assistant Examiner* — Magdi Elhag
(74) *Attorney, Agent, or Firm* — Staas & Halsey LLP

(57) ABSTRACT

A method, an apparatus, and a system for managing emergency services of a mobility-restricted Mobile Station (MS) are disclosed. The method includes: an Anchor-Service Flow Authorization entity (A-SFA) obtains emergency service information or an Emergency Service Flag (ES_Flag), where the emergency service information or the ES_Flag serves as an indication of providing emergency services for the mobility-restricted Mobile Station (MS); constructs, according to the emergency service information or the ES_Flag, an emergency service indicator in an MS context maintained by the A-SFA; and sends a Path Registration Request (Path_Reg_Req) to a Base Station (BS), where the Path_Reg_Req carries the ES_Flag if what is obtained is the ES_Flag; or, if what is obtained is the emergency service information, generates the ES_Flag according to the emergency service indicator or emergency service information, and adds the generated ES_Flag into the Path_Reg_Req.

18 Claims, 8 Drawing Sheets

U.S. PATENT DOCUMENTS

| | | | |
|---|---|---|---|
| 2007/0213029 A1* | 9/2007 | Edney et al. | 455/404.1 |
| 2008/0220772 A1* | 9/2008 | Islam et al. | 455/432.2 |
| 2008/0261554 A1* | 10/2008 | Keller et al. | 455/404.1 |
| 2008/0279150 A1* | 11/2008 | Shousterman et al. | 370/331 |
| 2009/0264095 A1* | 10/2009 | Khetawat et al. | 455/404.2 |
| 2010/0014508 A1 | 1/2010 | Yang | |
| 2010/0135205 A1* | 6/2010 | Li et al. | 370/328 |
| 2010/0323662 A1* | 12/2010 | Dahlen et al. | 455/410 |

FOREIGN PATENT DOCUMENTS

| | | |
|---|---|---|
| CN | 101031135 | 9/2007 |
| CN | 101198159 | 6/2008 |
| WO | WO 2008/052744 | 5/2008 |
| WO | WO 2008/093218 | 8/2008 |

OTHER PUBLICATIONS

WiMax Forum Network Architecture (Stage 3: Detailed Protocols and Procedures) [Annex: R6/R8 Anchored Mobility Scenarios] *Implementation Draft*, Release 1, Version 1.3.1, WiMax Forum, Dec. 28, 2008, pp. 1-12.

WiMax Forum Network Architecture (Stage 3: Detailed Protocols and Procedures) [Annex: Hooks and Principles for Evolution (informative)] *Implementation Draft*, Release 1, Version 1.3.1, WiMax Forum, Dec. 28, 2008, pp. 1-23.

WiMax Forum Network Architecture (Stage 3: Detailed Protocols and Procedures) [Annex: Prepaid Accounting] *Implementation Draft*, Release 1, Version 1.3.1, WiMax Forum, Dec. 28, 2008, pp. 1-37.

WiMax Forum Network Architecture (Stage 3: Detailed Protocols and Procedures) *Implementation Draft*, Release 1, Version 1.3.1, WiMax Forum, Dec. 28, 2008, pp. 1-706.

International Search Report, mailed Feb. 11, 2011, in corresponding International Application No. PCT/CN2009/074924 (4 pp.).

Written Opinion of the International Searching Authority, mailed Feb. 11, 2010, in corresponding International Application No. PCT/CN2009/074924 (4 PP.).

* cited by examiner

METHOD, APPARATUS AND SYSTEM FOR MANAGING EMERGENCY SERVICES OF MOBILITY-RESTRICTED MOBILE STATION

CROSS-REFERENCE TO RELATED APPLICATIONS

This application is a continuation of International Application No. PCT/CN2009/074924, filed on Nov. 17, 2009, which claims priority to Chinese Patent Application No. 200810217683.0, filed on Nov. 26, 2008, both of which are hereby incorporated by reference in their entireties.

FIELD OF THE INVENTION

The present invention relates to the field of communication technologies, and in particular, to a method, an apparatus, and a system for managing emergency services of a mobility-restricted Mobile Station (MS).

BACKGROUND OF THE INVENTION

Worldwide Interoperability for Microwave Access (WiMAX) is an air interface standard put forward on the basis of IEEE802.16 broadband wireless standards. Currently, the wireless side of the WiMAX network is based on the IEEE 802.16d/e standard. The 802.16d standard defines the Media Access Control (MAC) layer of a fixed broadband wireless access system that supports multiple service types, and defines multiple corresponding physical-layer frameworks. The 802.16e standard adds new functions on the basis of the 802.16d standard to support subscriber mobility.

FIG. 1 shows a reference model of a WiMAX network architecture. A WiMAX network includes three parts: MS or Subscriber Station (SS), Access Service Network (ASN), and Connectivity Service Network (CSN).

The ASN may include a Base Station (BS) and an ASN Gateway (GW); the CSN may include a Prepaid Service (PPS) server, and an Authentication, Authorization and Accounting (AAA) server.

In the existing protocols, the logical entities between the MS/SS, the ASN, and the CSN communicate with each other through interfaces R1 to R6. As shown in FIG. 1, the R1 interface is a wireless air interface, and is primarily defined by the IEEE802.16d/e; the R2 interface is a logical interface; the R3, R4, and R5 interfaces are wired interfaces.

The WiMAX network supports three application scenarios of the MS: fixed scenario, nomadic scenario and mobile scenario. The inventor of the present invention finds that: in the prior art, when the MS is in a fixed scenario or a nomadic scenario, it is unable to manage emergency services of a mobility-restricted MS.

SUMMARY OF THE INVENTION

Embodiments of the present invention disclose a method, an apparatus, and a system for managing emergency services of a mobility-restricted MS.

A method for managing emergency services of a mobility-restricted MS includes:

by an Anchor-Service Flow Authorization entity (A-SFA), obtaining emergency service information or an Emergency Service Flag (ES_Flag), where the emergency service information or the ES_Flag serves as an indication of providing emergency services for the mobility-restricted MS;

constructing, according to the emergency service information or the ES_Flag, an emergency service indicator in an MS context maintained by the A-SFA; and sending a Path Registration Request (Path_Reg_Req) to a BS, where the Path_Reg_Req carries the ES_Flag if what is obtained is the ES_Flag; or if what is obtained is the emergency service information, generating the ES_Flag according to the emergency service indicator or emergency service information, and adding the generated ES_Flag into the Path_Reg_Req.

An apparatus for managing emergency services of a mobility-restricted MS includes:

an obtaining module, configured to obtain emergency service information or an ES_Flag;

a context maintaining module, configured to construct an emergency service indicator in a context of the MS according to the emergency service information or the ES_Flag obtained by the obtaining module; and a sending module, configured to: send a Path_Reg_Req to a BS or send a Resource Reservation Request (RR_Req) to a Serving-Service Flow Authorization entity (S-SFA), where the Path_Reg_Req or RR_Req carries the ES_Flag if what is obtained by the obtaining module is the ES_Flag; or, if what is obtained by the obtaining module is the emergency service information, generate an ES_Flag according to the emergency service indicator constructed by the context maintaining module or the emergency service information obtained by the obtaining module, and add the ES_Flag into the Path_Reg_Req or RR_Req.

A BS includes:

a receiving module, configured to receive an ES_Flag from an ASN GW;

a context maintaining module, configured to construct an emergency service indicator in a context of an MS according to emergency service information or the ES_Flag received by the receiving module; and a mobility restriction policy executing module, configured to suspend, according to the emergency service indicator in the MS context in the context maintaining module, execution of a mobility restriction policy for the MS.

A system for managing emergency services of a mobility-restricted MS includes an ASN GW and a BS connected, in a communication-capable way, to the ASN GW.

The ASN GW is configured to: obtain emergency service information or an ES_Flag, where the emergency service information or the ES_Flag serves as an indication of providing emergency services for the mobility-restricted MS; construct, according to the emergency service information or the ES_Flag, an emergency service indicator in an MS context maintained by the ASN GW; and send a Path_Reg_Req to the BS, where the Path_Reg_Req carries the ES_Flag if what is obtained is the ES_Flag; or, if what is obtained is the emergency service information, generate an ES_Flag according to the emergency service indicator or emergency service information, and add the generated ES_Flag into the Path_Reg_Req.

The BS is configured to construct, according to the ES_Flag from the ASN GW, an emergency service indicator in the MS context maintained by the BS, and suspend execution of a mobility restriction policy for the MS.

Through the method, apparatus and system disclosed herein, the A-SFA can obtain the emergency service information or ES_Flag, and construct an emergency service indicator in the MS context to indicate that the service initiated by the MS is an emergency service, thus managing emergency services of the MS properly.

DETAILED DESCRIPTION OF THE EMBODIMENTS

To make the technical solution, objectives and merits of the present invention clearer, the following describes the embodiments of the present invention in more detail with reference to the accompanying drawings.

The technical solution described herein is an emergency service application based on an Internet Protocol Multimedia Subsystem (IMS). The network model is shown in FIG. 2.

A Proxy-Call Session Control Function (P-CSCF) is a first connection point from the MS to the IMS. At a Session Initiation Protocol (SIP) layer, the P-CSCF acts as a SIP proxy server; when being connected to a Policy and Charging Control (PCC) system, the P-CSCF acts as an Application Function (AF). The Emergency-Call Session Control Function (E-CSCF) in FIG. 2 is a Call Session Control Function (CSCF) designed to manage emergency services in the system, and is connected to an emergency service network. Other network elements of the IMS system are not shown in FIG. 2. The MS uses the IMS system through the P-CSCF. In the embodiments of the present invention, the use of the IMS system is based on the prior art and is not described here.

Optionally, a PCC system may be deployed in the network. In a PCC system, a Policy Control and Charging Rules Function (PCRF) is a combination of a Policy Decision Function (PDF) and a Charging Rules Function (CRF), and is located in the CSN. The main functions of the PCRF are dynamic Quality of Service (QoS) policy control and flow-based charging control. The PCRF also provides authorization control based on subscription information, namely, generates the corresponding PCC rules according to the resource description information provided by the P-CSCF or Policy and Charging Enforcement Function (PCEF) and subscription information provided by a Subscription Profile Repository (SPR) located in the CSN, and delivers the PCC rules to the PCEF through an R3 interface. When a PCC system is deployed in a WiMAX network, the PCEF is a logical concept, and is an integration of existing network elements in the WiMAX network. That is, the functions of the PCEF in the PCC system are implemented by the existing network elements in the WiMAX network. Specifically, in this embodiment, the participating network elements include an A-SFA and an S-SFA. In the following description, if a PCC system is deployed in the network, the network elements actually involved in the WiMAX network will be used to expound the PCEF so that the technical solution can be understood more clearly.

Figure 1:
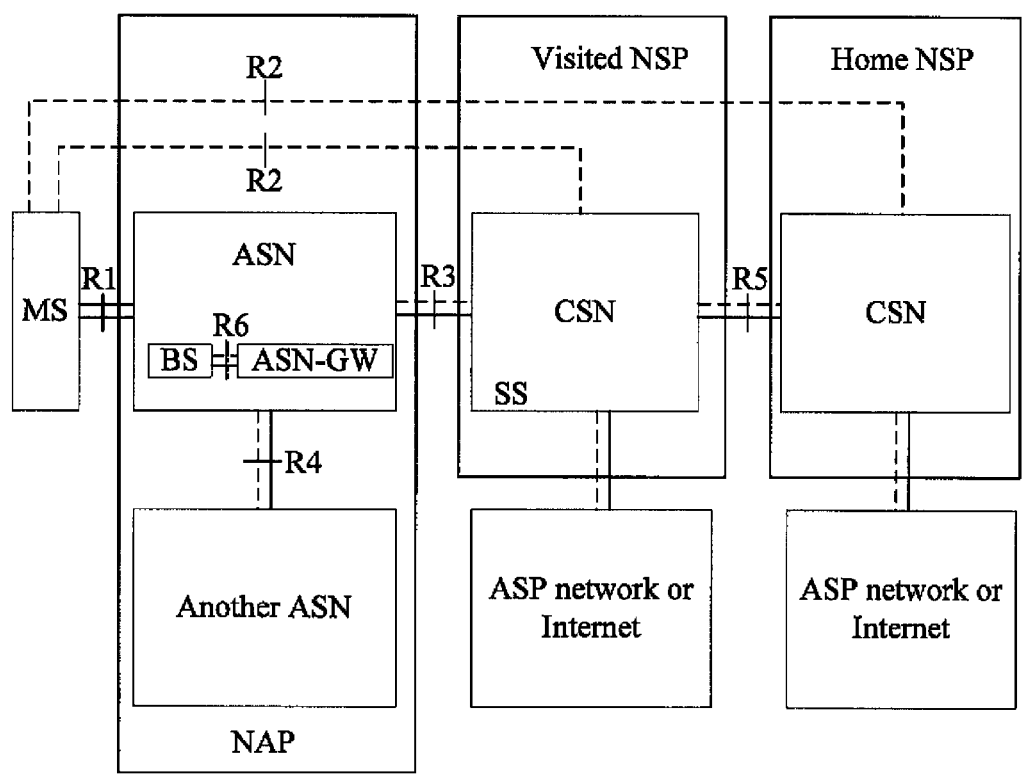
FIG. 1 is a logical structural diagram of a WiMAX network in the prior art.
Figure 2:
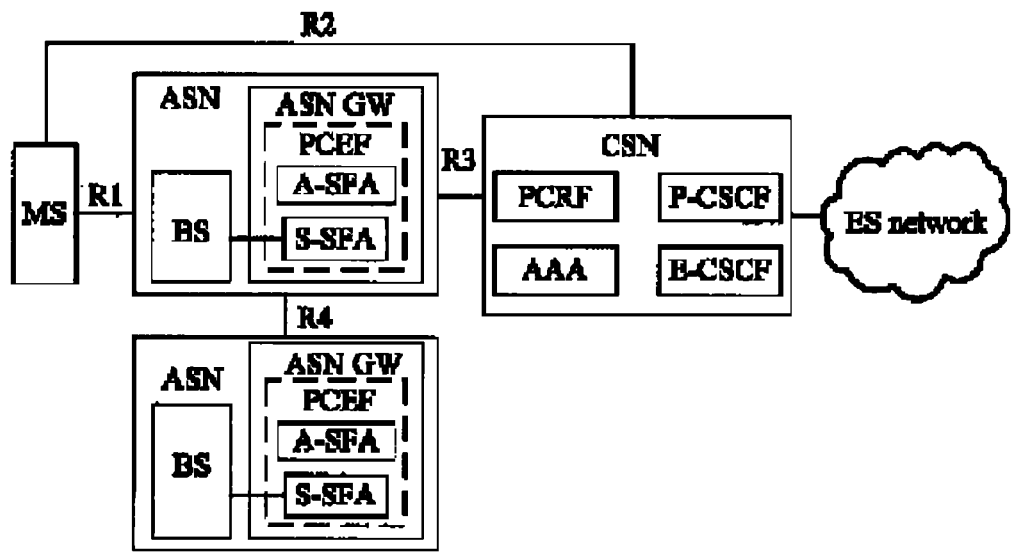
FIG. 2 is a schematic diagram of an application network model according to an embodiment of the present invention.

Based on the network shown in FIG. 2, a method for managing emergency services of a mobility-restricted MS is disclosed in an embodiment of the present invention. In the subscription relation between the MS and the network side in the method, the mobility policy is restricted as being applicable only to fixed scenarios or nomadic scenarios, and therefore, the MS is referred to as a mobility-restricted MS. For brevity in the following embodiments, a mobility-restricted MS is shortly expressed as an MS.

A network access area of fixed access subscribers can be identified by identifiers of one or more BSs related to network subscription or by region information related to network subscription; and a network access area of nomadic subscribers may span a wide geographic area, and a subscriber can access the network at different geographic locations. Due to mobility restrictions, the MS may fail to use emergency services.

A method for managing emergency services requested by a mobility-restricted MS is disclosed in an embodiment of the present invention, so as to realize the managing of emergency services of a mobility-restricted MS.

When initiating an emergency service in this embodiment, the MS may access any BS no matter whether the BS is located in the network access area of the MS.

Figure 3:
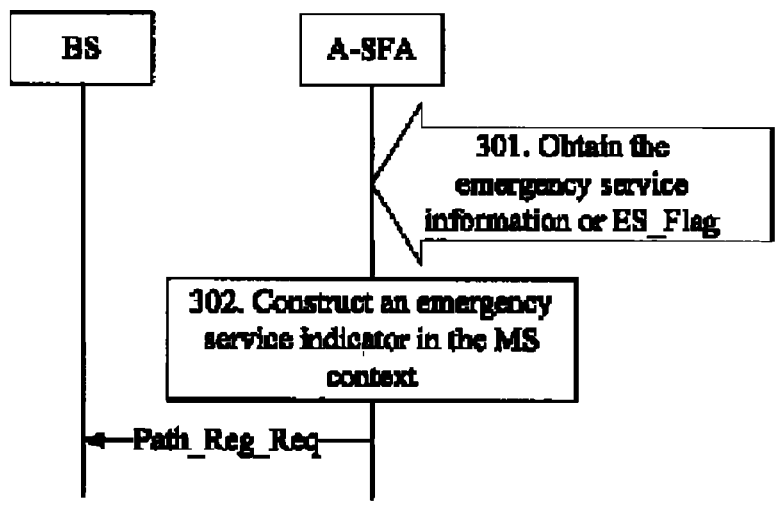
FIG. 3 is a flowchart of a method for managing emergency services of a mobility-restricted MS according to an embodiment of the present invention.

As shown in FIG. 3, the method includes the following steps:

Step 301: The A-SFA obtains emergency service information or an ES_Flag, where the emergency service information or the ES_Flag serves as an indication of providing emergency services for an MS.

Specifically, the A-SFA may obtain the emergency service information or the ES_Flag in at least the following modes:

The A-SFA receives an indication of initiating setup of an emergency service bearer path and a service flow, where the indication is sent by a Voice Service Provider (VSP) and carries the emergency service information.

Or, the A-SFA receives an Access Accept indication from an AAA server, where the Access Accept indication carries the ES_Flag.

Or, the A-SFA receives a PCC indication from a PCRF, where the PCC indication carries the ES_Flag.

Step 302: The A-SFA constructs, according to the emergency service information or the ES_Flag, an emergency service indicator in an MS context maintained by the A-SFA.

It should be noted that the emergency service information is the information designed to indicate that a service is intended as an emergency service in the prior art. For example, in a SIP protocol, a Uniform Resource Identifier (URI) in each message is set to ES URN, indicating that the service is intended as an emergency service; in Extensible Authentication Protocol (EAP) authentication, a Network Access Identifier (NAI) is set to NAI (sm=2), indicating that the service is intended as an emergency service. The URI or NAI (sm=2) set to ES URN is the emergency service information.

The ES_Flag is an information element defined in this embodiment, and is expressed as "ES_Flag" in the subsequent embodiments. The ES_Flag indicates that the message is applied to an emergency service, and that the service triggered by the message is an emergency service. The ES_Flag may be generated by a network element according to the emergency service information.

The emergency service indicator is a property in an MS context defined in this embodiment. In the subsequent embodiments, it is assumed that the emergency service indicator is an ES bit. When the emergency service indicator is set to a specific value, the emergency service indicator is constructed in the MS context, indicating that the MS corresponding to the MS context is using an emergency service; when the emergency service indicator is cleared to zero, the emergency service indicator is cleared in the MS context, indicating that the MS corresponding to the MS context is using no emergency service. Further, the network elements that execute the mobility restriction policy on the network side may suspend executing the mobility restriction policy for the MS as soon as the ES bit is set to a specific value, and resume executing the mobility restriction policy for the MS as soon as the ES bit is cleared to zero. Moreover, the network element for maintaining the MS context on the network side may set the ES bit in the MS context to a specific value according to the ES_Flag in the received message, or add the ES_Flag into a message destined for another network element according to the ES bit set in the MS context maintained by the network element. Those skilled in the art understand that "ES bit" is only an example of emergency service indicators. In all embodiments described herein, the ES bit may be in any other form that indicates a specific property in the prior art, for example, a field set to a specific value which indicates the corresponding information.

Step 303: The A-SFA sends a Path_Reg_Req to a BS, where the Path_Reg_Req carries the ES_Flag. It should be noted that: If in step 301, what is obtained by the A-SFA is the ES_Flag, the Path_Reg_Req sent to the BS in this step carries the ES_Flag; or, if in step 301, what is obtained by the A-SFA is the emergency service information, the A-SFA in this step generates an ES_Flag according to the emergency service indicator or emergency service information, and adds the generated ES_Flag into the Path_Reg_Req.

Through the method disclosed herein, the A-SFA can obtain the emergency service information or the ES_Flag corresponding to the emergency service provided for the MS, construct an emergency service indicator in the MS context to indicate that the service initiated by the MS is an emergency service, and send the ES_Flag to the BS, thus managing emergency services of the MS properly.

The method for managing emergency services of a mobility-restricted MS is further expounded below with reference to preferred embodiments of the present invention.

It is assumed that the emergency service is controlled by an AAA server. In the scenario described in this embodiment, a PCC system may be deployed in the network or not. No matter whether a PCC system is deployed in the network, the emergency service is controlled by the AAA server.

It should be noted that in the scenario in this embodiment, the MS is attached to the network normally before initiating the emergency service.

Figure 4A:
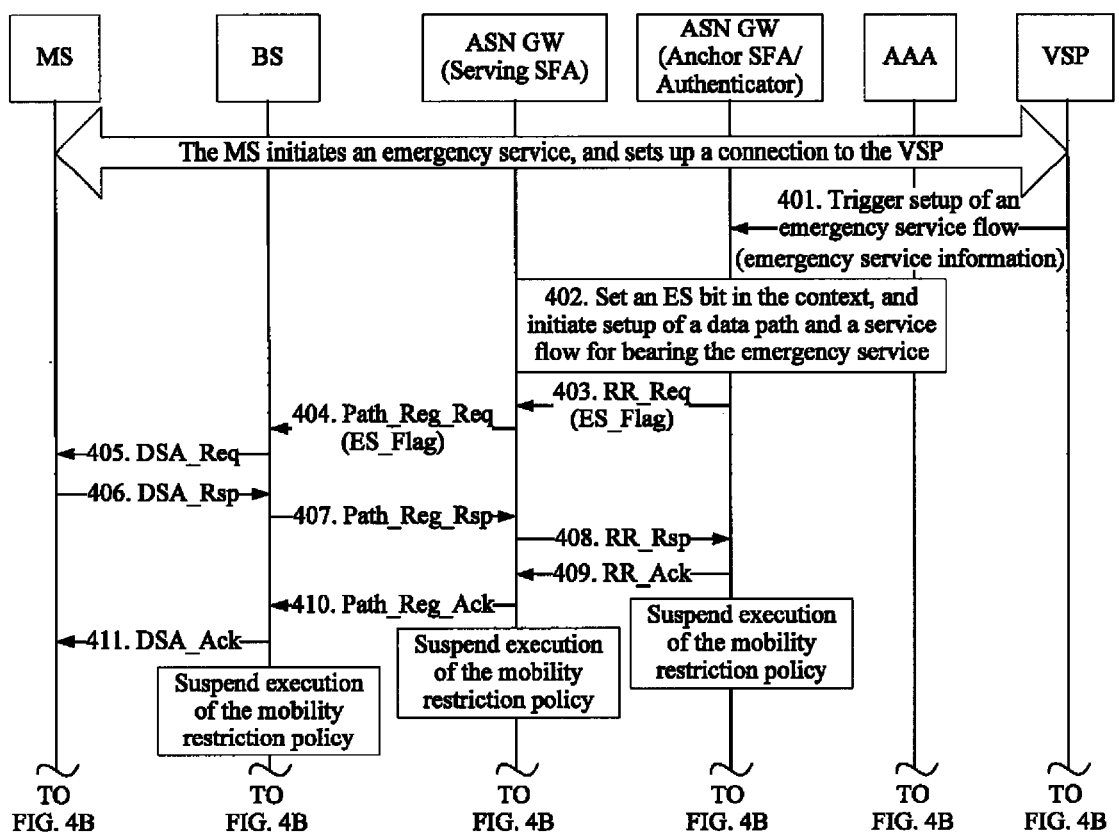
FIG. 4A and FIG. 4B are flowcharts of a method for managing emergency services of a mobility-restricted MS according to an embodiment of the present invention.
Figure 4B:
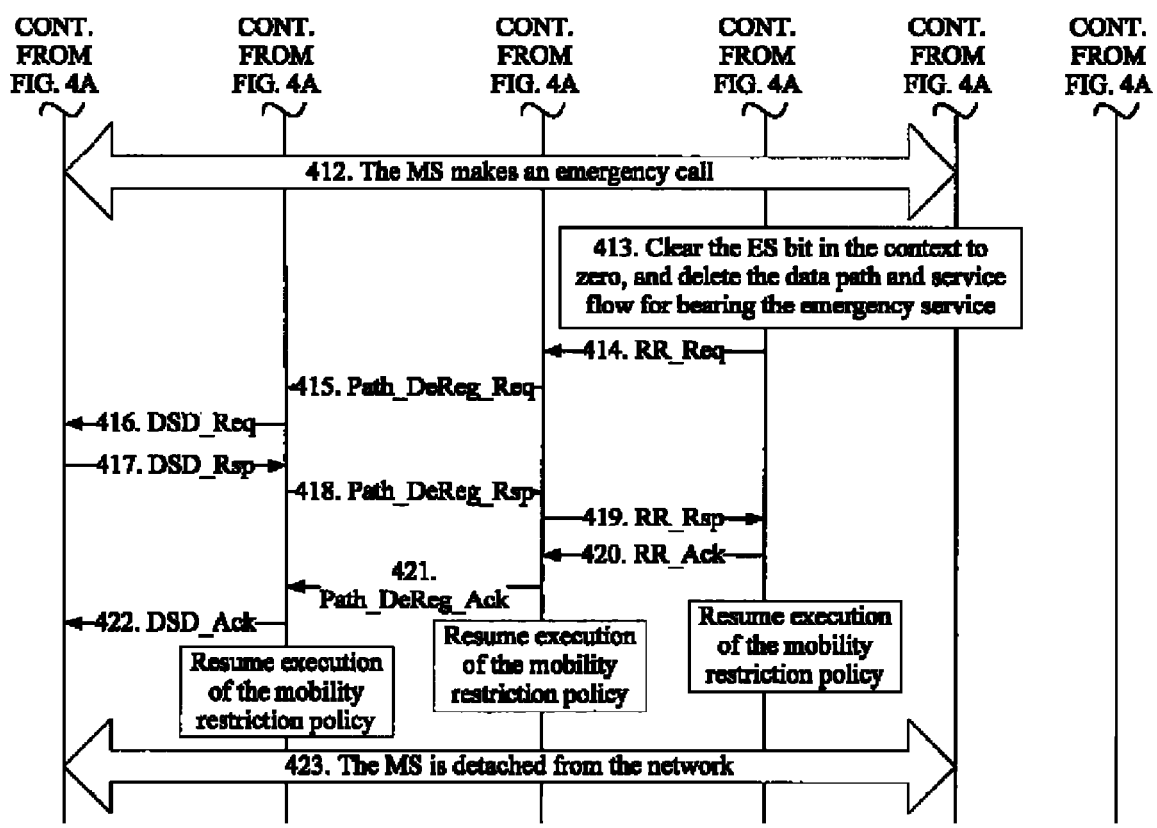

As shown in FIG. 4, the method includes the following steps:

The MS initiates an emergency service, and sets up a connection to the VSP through an R2 interface. This process is based on the prior art, and is not described here. In this process, the VSP can discover that the service is an emergency service.

Step 401: The VSP triggers the A-SFA of the MS to initiate setup of an emergency service flow. In the triggering process, the VSP transmits an emergency service message to the A-SFA, indicating that the service is an emergency service. This step is based on the prior art. Depending on the type of the Voice over Internet Protocol (VoIP), the triggering message differs. For example, if VoIP is based on SIP, the VSP may send a SIP OK message to the A-SFA. The URI in the SIP OK message is set to ES URN, indicating that the service is an emergency service.

Step 402: The A-SFA sets the ES bit (emergency service indicator) to a specific value in the MS context according to the emergency service information, and initiates setup of a service flow for bearing the emergency service. In this embodiment, the ES bit set to a specific value in the MS context indicates suspension of executing the mobility restriction policy of the MS. Optionally, an authenticator located with the A-SFA may suspend executing the mobility restriction policy for the MS in this step.

Step 403: The A-SFA sends an RR_Req message to the S-SFA, and sets up a service flow that bears the emergency service. The RR_Req message carries an ES_Flag. The ES_Flag is generated by the A-SFA according to the emergency service information or the set ES bit.

It should be noted that the A-SFA and the S-SFA may also be located in the same ASN GW. If the A-SFA and the S-SFA are located in the same ASN GW, this step is omissible, or may be implemented through an internal protocol of the ASN GW.

Step 404: The S-SFA sets, according to the ES_Flag, the ES bit to a specific value in the MS context maintained by the S-SFA, and sends the service flow information and the ES_Flag in the RR_Req message to the BS. Optionally, as regards the sending mode, the service flow information and the ES_Flag carried in the RR_Req message may be encapsulated in the Path_Reg_Req to the BS. Optionally, the S-SFA may suspend executing the mobility restriction policy for the MS in this step.

Step 405: The BS sets, according to the ES_Flag, the ES bit to a specific value in the MS context maintained by the BS, and sends a Dynamic Service Addition Request (DSA_Req) message to the MS to set up an air interface service flow that bears the emergency service. Optionally, the BS may suspend executing the mobility restriction policy for the MS in this step.

Step 406: The MS returns a Dynamic Service Addition Response (DSA_Rsp) message to the BS.

Step 407: The BS returns a Path Registration Response (Path_Reg_Rsp) message to the S-SFA.

Step 408: The S-SFA returns a Resource Reservation Response (RR_Rsp) message to the A-SFA.

It should be noted that the A-SFA and the S-SFA may also be located in the same ASN GW. If the A-SFA and the S-SFA are located in the same ASN GW, this step is omissible, or may be implemented through an internal protocol of the ASN GW.

Step 409: The A-SFA returns a Resource Reservation Acknowledgement (RR_Ack) message to the S-SFA. If the authenticator located with the A-SFA in step 402 does not suspend executing the mobility restriction policy for the MS, the authenticator located with the A-SFA in this step suspends executing the mobility restriction policy for the MS. It should be noted that the authenticator may suspend executing the mobility restriction policy for the MS before, at the same time as or after the A-SFA sends the RR_Ack message to the S-SFA.

It should be noted that the A-SFA and the S-SFA may also be located in the same ASN GW. If the A-SFA and the S-SFA are located in the same ASN GW, this step is omissible, or may be implemented through an internal protocol of the ASN GW. If the authenticator located with the A-SFA in step 402 does not suspend executing the mobility restriction policy for the MS, the authenticator located with the A-SFA in this step should suspend executing the mobility restriction policy for the MS.

Step 410: The S-SFA returns a Path Registration Acknowledgement (Path_Reg_Ack) message to the BS. If the S-SFA in step 404 does not suspend executing the mobility restriction policy for the MS, the S-SFA in this step suspends executing the mobility restriction policy for the MS. It should be noted that the S-SFA may suspend executing the mobility restriction policy for the MS before, at the same time as or after sending the Path_Reg_Ack message to the BS.

Step 411: The BS returns a Dynamic Service Addition Acknowledgement (DSA_Ack) message to the MS. If the BS in step 405 does not suspend executing the mobility restriction policy for the MS, the BS in this step suspends executing the mobility restriction policy for the MS. It should be noted that the BS may suspend executing the mobility restriction policy for the MS before, at the same time as or after sending the DSA_Ack message to the MS.

Step 412: The MS uses the emergency service.

Step 413: The MS finishes the emergency service, and the A-SFA may clear the ES bit to zero in the MS context maintained by the A-SFA, and initiate a procedure for deleting the data path and the service flow that bear the emergency service. Optionally, an authenticator located with the A-SFA may resume executing the mobility restriction policy for the MS.

Step 414: The A-SFA sends an RR_Req message to the S-SFA, and deletes the service flow that bears the emergency service.

It should be noted that the A-SFA and the S-SFA may also be located in the same ASN GW. If the A-SFA and the S-SFA are located in the same ASN GW, this step is omissible, or may be implemented through an internal protocol of the ASN GW.

Step 415: The S-SFA sends a Path Deregistration Request (Path_DeReg_Req) message to the BS, and deletes the service flow and data path that bear the emergency service. Optionally, the S-SFA may clear the ES bit to zero in the MS context maintained by the S-SFA, and resume executing the mobility restriction policy for the MS.

Step 416: The BS returns a Dynamic Service Deletion Request (DSD_Req) message to the MS to delete the air interface service flow that bears the emergency service. Optionally, the BS may clear the ES bit to zero in the MS context maintained by the BS, and resume executing the mobility restriction policy for the MS.

Step 417: The MS returns a Dynamic Service Deletion Response (DSD_Rsp) message to the BS.

Step 418: The BS returns a Path Deregistration Response (Path_DeReg_Rsp) message to the S-SFA.

Step 419: The S-SFA returns an RR_Rsp message to the A-SFA.

It should be noted that the A-SFA and the S-SFA may also be located in the same ASN GW. If the A-SFA and the S-SFA are located in the same ASN GW, this step is omissible, or may be implemented through an internal protocol of the ASN GW.

Step 420: The A-SFA returns an RR_Ack message to the S-SFA. If the A-SFA does not clear the ES bit to zero in the MS context maintained by the A-SFA in step 413, the A-SFA in this step clears the ES bit to zero in the MS context maintained by the A-SFA, and the authenticator located with the A-SFA resumes executing the mobility restriction policy for the MS. Or, if the authenticator located with the A-SFA does not resume executing the mobility restriction policy for the MS in step 413, the authenticator in this step resumes executing the mobility restriction policy for the MS. It should be noted that the authenticator may resume executing the mobility restriction policy for the MS before, at the same time as or after sending the RR_Ack message to the S-SFA.

It should be noted that the A-SFA and the S-SFA may also be located in the same ASN GW. If the A-SFA and the S-SFA are located in the same ASN GW, this step is omissible, or may be implemented through an internal protocol of the ASN GW. However, the authenticator located with the A-SFA should resume executing the mobility restriction policy for the MS.

Step 421: The S-SFA returns a Path Deregistration Acknowledgement (Path_DeReg_Ack) message to the BS. If the S-SFA does not clear the ES bit to zero in the MS context maintained by the S-SFA or resume executing the mobility restriction policy for the MS in step 415, the S-SFA in this step clears the ES bit to zero in the MS context maintained by the S-SFA, and resumes executing the mobility restriction policy for the MS. It should be noted that the S-SFA may resume executing the mobility restriction policy for the MS before, at the same time as or after sending the Path_DeReg_Ack message to the BS.

Step 422: The BS returns a Dynamic Service Deletion Acknowledgement (DSD_Ack) message to the MS. If the BS does not clear the ES bit to zero in the MS context maintained by the BS or resume executing the mobility restriction policy for the MS in step 416, the BS in this step clears the ES bit to zero in the MS context maintained by the BS, and resumes executing the mobility restriction policy for the MS. It should be noted that the BS may resume executing the mobility restriction policy for the MS before, at the same time as or after sending the DSD_Ack message to the MS.

Step 423: Optionally, if the network finds that the MS is outside the network access area, the network initiates a process of detaching the MS from the network, and the MS is detached from the network according to the prior art.

Through the method provided in this embodiment, in the scenario where an AAA server in the network controls the emergency service, when the MS attached to the network initiates an emergency service, the A-SFA sets the ES bit to a specific value in the MS context maintained by the A-SFA according to the ES-Flag, sends the ES-Flag to the S-SFA and the BS, and defines that the execution of the mobility restriction policy for the MS is suspended after the ES bit is set in the MS context. In this way, the MS can use the emergency service normally. Further, the execution of the mobility restriction policy may be resumed after the completion of the emergency service.

In the foregoing embodiments, the MS is attached to the network normally when initiating the emergency service. In a scenario of emergency services, the MS may be detached from the network when initiating an emergency service. The following embodiment discloses a technical solution applicable to the scenario of initiating an emergency service when the MS is detached from the network.

It is assumed that the emergency service is controlled by an AAA server. In the scenario described in this embodiment, a PCC system may be deployed in the network or not. No matter whether a PCC system is deployed in the network, the emergency service is controlled by the AAA server.

Figure 5:
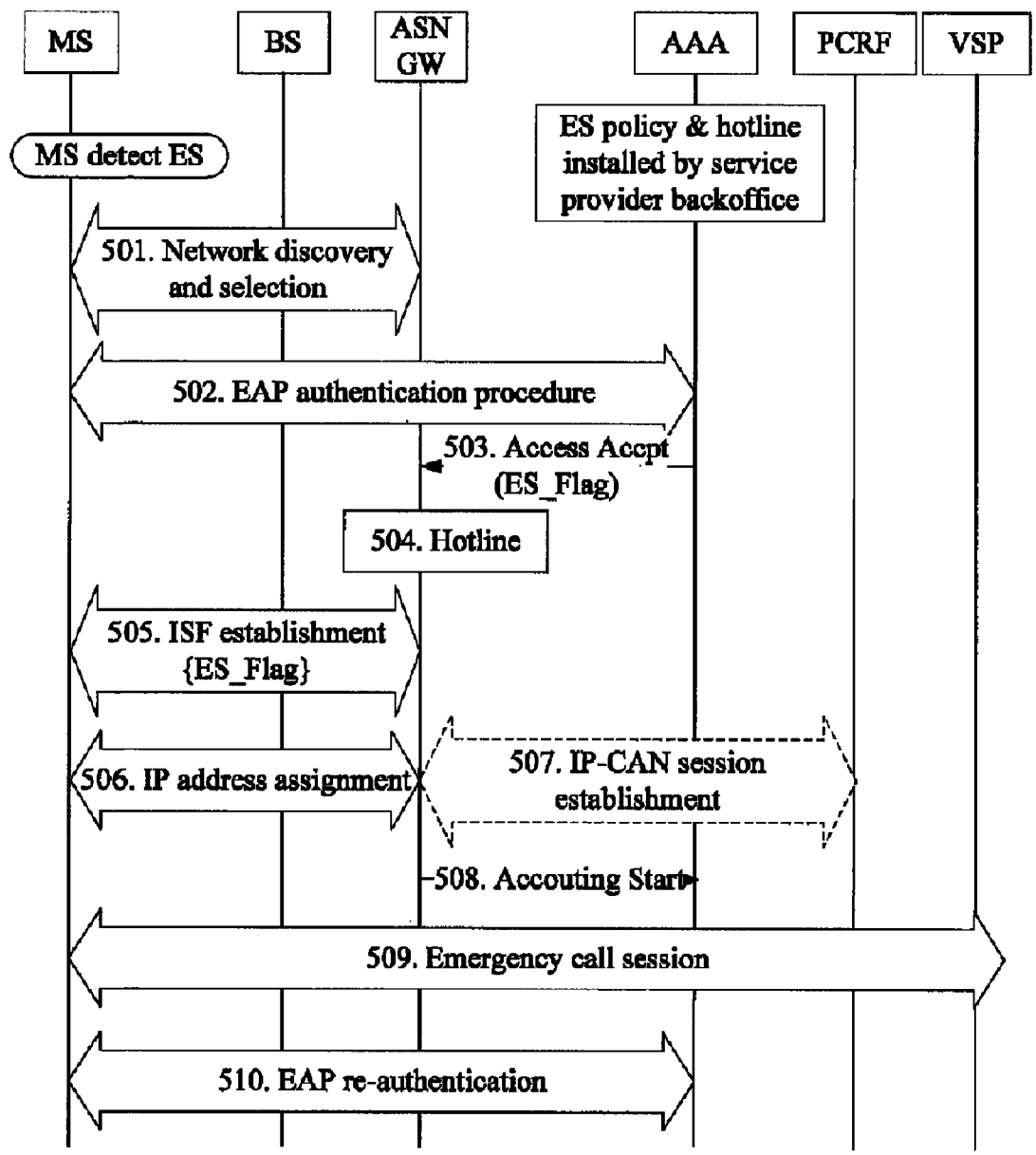
FIG. 5 is a flowchart of a method for managing emergency services of a mobility-restricted MS according to an embodiment of the present invention.

As shown in FIG. 5, the method includes the following steps:

Step 501: When requiring an emergency service, the MS discovers and selects a network, and initiates a process of accessing the network.

Step 502: The MS performs the access authentication process with an AAA server, namely, an EAP authentication process. In the EAP authentication, the MS uses a NAI (sm=2) to indicate that the authentication is intended for an emergency service. NAI is an acronym of Network Access Identifier. This process is based on the prior art, and is not described here.

Step 503: The emergency service policy and the hotline service policy installed by the service provider at the back end are stored on the AAA server. The AAA server performs authentication and authorization for the emergency service of the MS according to the emergency service policy, and sends an Access Accept message to the authenticator located at the ASN GW. The Access Accept message carries a mobility restriction parameter for the MS and an ES_Flag. The ES_Flag is an information element in the message, and is generated according to the NAI (sm=2).

Step 504: The authenticator provides optional hotline services according to the policy delivered by the AAA server. This step is optional. The hotline services are the services provided by the network for the MS and are set according to the policy of the network in special circumstances, for example, the emergency call service provided by the network for the MS when the MS is delinquent.

Step 505: The service flow is set up or modified for this service between the ASN GW and the BS, and the ASN GW transmits the ES-Flag to the BS.

The SFA located with the authenticator on the ASN GW sets, according to the ES_Flag, the ES bit to a specific value in the MS context maintained by the SFA, and the authenticator suspends executing the mobility restriction policy for the MS.

The SFA encapsulates the service flow information of this session and the ES_Flag into a Path_Reg_Req message, and sends the message to the BS.

The BS sets the ES bit to a specific value in the MS context maintained by the BS, and suspends executing the mobility restriction policy for the MS. The data path is registered between the BS and the S-SFA according to the prior art.

It should be noted that the SFA may be divided into an A-SFA and an S-SFA, which are deployed on different ASN GWs separately. In this case, the SFA located with the authenticator is referred to as an A-SFA, and the foregoing step further includes: After the A-SFA sets, according to the ES_Flag, the ES bit to a specific value in the MS context maintained by the A-SFA, the A-SFA interacts with the S-SFA to set up the service flow, and the ES_Flag is carried in the RR_Req message sent to the S-SFA to indicate that the service is an emergency service. The S-SFA sets, according to the ES_Flag, the ES bit to a specific value in the MS context maintained by the S-SFA, and suspends executing the mobility restriction policy for the MS.

The S-SFA sends the ES_Flag to the BS according to the interaction procedure between the SFA and the BS.

Step 506: The MS obtains the IP address.

Step 507: Optionally, if a PCC system is deployed in the network, the PCEF sets up an Internet Protocol-Connectivity Access Network (IP-CAN) session with the PCRF. As described above, when a PCC system is deployed in a WiMAX network, the PCEF is an integration of existing network elements in the WiMAX network. That is, the functions of the PCEF in the PCC system are implemented by the existing network elements in the WiMAX network. In this step, the A-SFA sets up a session with the PCRF directly.

Step 508: The accounting client located on the ASN GW sends an Accounting Start message to the AAA server, instructing the AAA server to start the emergency service.

Step 509: The MS uses the emergency service through a VSP.

Step 510: The emergency service is ended. The entities that maintain the MS context clear the ES bit to zero, and resume executing the mobility restriction policy for the MS. For the detailed process, see steps 413-422 shown in FIG. 4. The network initiates re-authentication. In the re-authentication process, if the network finds that the MS accesses the BS from outside the network access area, the network initiates a process of detaching the MS from the network.

Through the method provided in this embodiment, in the scenario where an AAA server controls the emergency service in the network, the AAA server may set an ES_Flag to indicate that the service is an emergency service. Therefore, the network elements set the ES bit to a specific value in the MS context maintained by the network elements respectively according to the ES-Flag, and define that the execution of the mobility restriction policy for the MS is suspended after the ES bit is set in the MS context. In this way, the network elements suspend executing the mobility restriction policy for the MS in this emergency service, and the MS can implement the emergency service smoothly. Further, the execution of the mobility restriction policy may be resumed after completion of the emergency service.

The foregoing two embodiments give details about the method for managing emergency services of a mobility-restricted MS in the scenario where the emergency service is controlled by an AAA server. However, when a PCC system is deployed in the network, the emergency service may not be controlled by the AAA server. The following describes how to implement the method for managing emergency services of a mobility-restricted MS in this scenario.

This embodiment describes how to implement the method for managing emergency services of a mobility-restricted MS, supposing that a PCC system is deployed in the network and that the emergency services are controlled by a PCRF.

It should be noted that in the scenario in this embodiment, the MS is attached to the network normally before initiating the emergency service.

Figure 6:
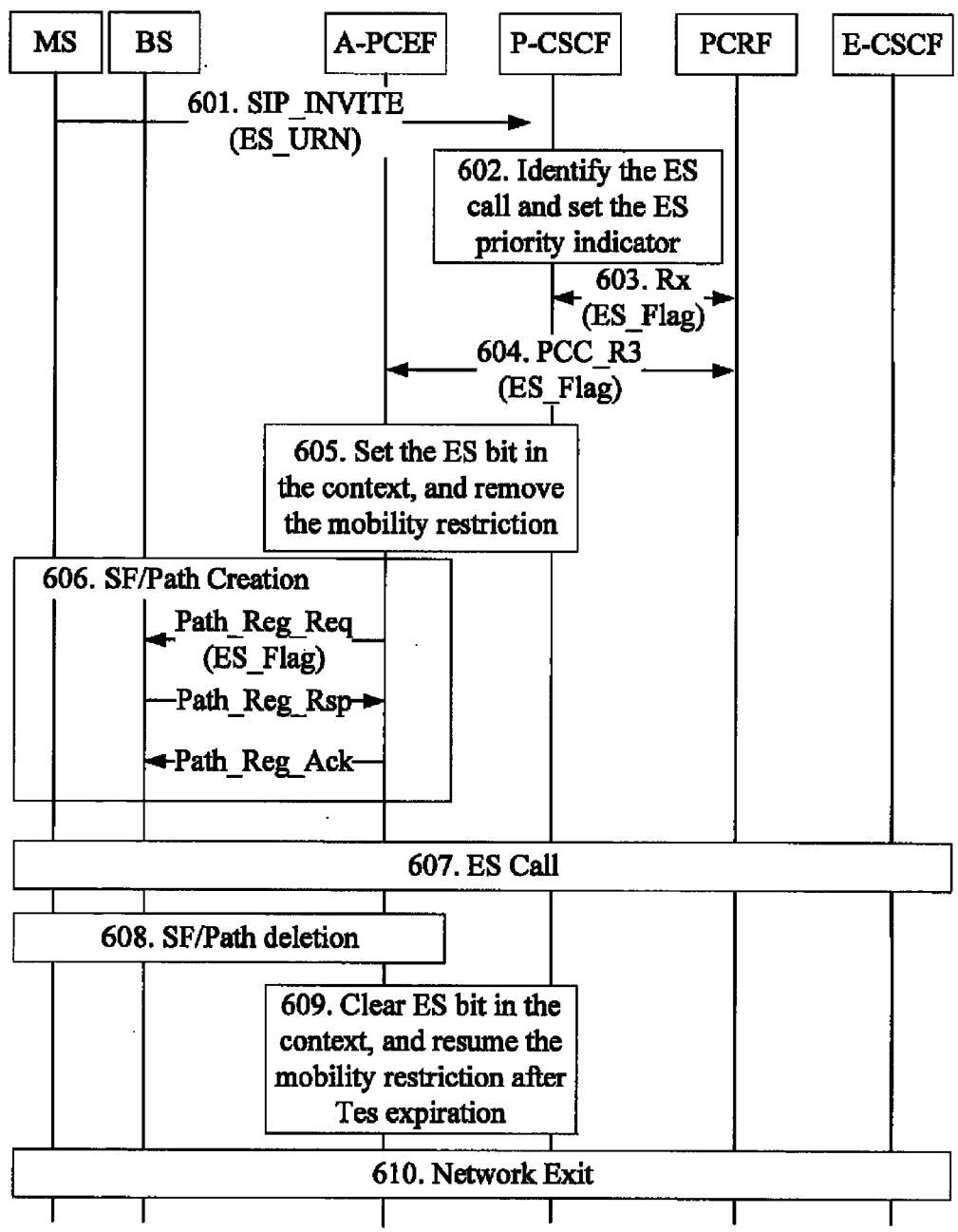
FIG. 6 is a flowchart of a method for managing emergency services of a mobility-restricted MS according to an embodiment of the present invention.

As shown in FIG. 6, the method includes the following steps:

Step 601: The MS initiates an emergency service, and sends a Session Initiation Protocol INVITE (SIP INVITE) message to the P-CSCF. The URI in the message is set to "ES URN". The ES URN is a property value indicating that the service is an emergency service.

Step 602: The P-CSCF identifies the service as an emergency service according to the UIR value "ES URN" in the SIP INVITE message. Once the P-CSCF identifies the emergency service, the P-CSCF sets a high-priority flag by adding a Resource-Priority property value into the SIP message. The P-CSCF exchanges the SIP message with the E-CSCF to set up a high-priority session according to the prior art.

Step 603: The P-CSCF sets a "reservation priority" property value which instructs the PCRF to set up a high-priority bearer, and sets up an ES_Flag to indicate that the bearer is intended for emergency services. The information exchange between the P-CSCF and the PCRF may be implemented through an Rx interface defined in the prior art.

Step 604: The PCRF exchanges PCC messages with an Anchor-Policy and Charging Enforcement Function (A-PCEF) through an R3 interface, and transmits the ES_Flag to the A-PCEF.

As described above, when a PCC system is deployed in a WiMAX network, the PCEF is an integration of existing network elements in the WiMAX network. That is, the functions of the PCEF in the PCC system are implemented by the existing network elements in the WiMAX network. In this step, the A-SFA sets up a session with the PCRF directly.

Step 605: The A-SFA sets, according to the ES_Flag, the ES bit to a specific value in the MS context maintained by the A-SFA, and the authenticator located with the A-SFA suspends executing the mobility restriction policy for the MS.

Step 606: The S-SFA in the A-PCEF creates or modifies a service flow for the emergency service, and indicates that the service flow is intended for emergency services, as detailed below:

If the A-SFA and the S-SFA are located on different ASN GWs, the A-SFA adds an ES_Flag into an RR_Req message sent to the S-SFA, indicating that the service is an emergency service; if the A-SFA and the S-SFA are located on the same ASN GW, the foregoing steps are omissible or performed by an internal protocol of the GW.

The S-SFA sets, according to the ES_Flag, the ES bit to a specific value in the MS context maintained by the S-SFA, suspends executing the mobility restriction policy for the MS, and sends a Path_Reg_Req message to the BS, where the message carries the ES_Flag, indicating that the service flow is intended for emergency services. The BS sets, according to the ES_Flag, the ES bit to a specific value in the MS context maintained by the BS, suspends executing the mobility restriction policy for the MS, and exchanges the Path_Reg_Rsp message and the Path_Reg_Ack message with the S-SFA according to the prior art to finish registering the data path.

Step 607: The MS sets up an emergency service session through the E-CSCF.

Step 608: The emergency service is ended, and the network deletes the relevant service flow and data path. For the detailed process, see steps 413-422 shown in FIG. 4.

Step 609: The BS, the S-SFA, and the A-SFA clear the ES bit to zero in the MS context maintained by them respectively; and the BS, the S-SFA, and the authenticator resume executing the mobility restriction policy for the MS. It should be noted that step 609 and step 608 may occur simultaneously if practicable in the prior art.

Step 610: Optionally, if the BS currently accessed by the MS is outside the network access area, the network initiates a process of detaching the MS from the network.

Through the method provided in this embodiment, in the scenario where a PCC system is deployed in the network and a PCRF controls the emergency services, the P-CSCF may set an ES_Flag to indicate that the service is an emergency service. Therefore, the network elements respectively set according to the ES-Flag the ES bit to a specific value in the MS context maintained by the network elements, and define that the execution of the mobility restriction policy for the MS is suspended after the ES bit is set in the MS context. In this way, the network elements suspend executing the mobility restriction policy for the MS in this emergency service, and the MS can implement the emergency service smoothly. Further, the execution of the mobility restriction policy may be resumed after completion of the emergency service.

It should be noted that when a PCC system is deployed in the network and the emergency services are controlled by the PCRF, if the MS is detached from the network when initiating the emergency service, the processing method may be: Steps 501-508 of the method shown in FIG. 5 may be performed before step 601 shown in FIG. 6. It should be noted that in step 503, the Accept Access message carries mobility restriction parameters rather than the ES-Flag; in step 505, the ASN GW performs no operation related to the ES_Flag or ES bit. Afterward, the complete method shown in FIG. 6 can be implemented.

The foregoing embodiments describe how a mobility-restricted MS initiates an emergency service in different scenarios. The MS may move in the process of using an emergency service, which triggers handover between BSs. In the handover process, the emergency service needs to go on continuously. The following embodiment deals with a method for keeping continuity of an ongoing emergency service in the process of handover of a mobility-restricted MS.

Figure 7:
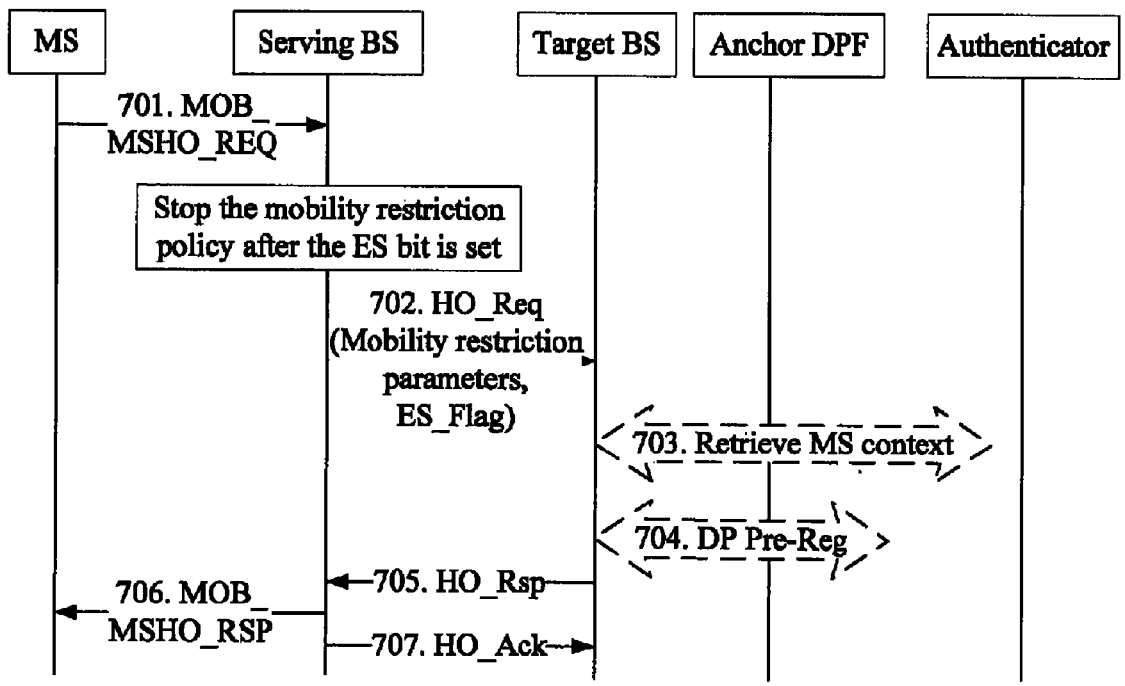
FIG. 7 is a flowchart of a method for managing emergency services of a mobility-restricted MS according to an embodiment of the present invention.

As shown in FIG. 7, the method includes the following steps:

Step 701: The MS sends an MS handover request (MOB_MSHO_REQ) message to the serving BS to initiate a handover process. The MOB_MSHO_REQ message includes identifiers of one or more possible target BSs.

Step 702: After finding that the ES bit is set in the MS context maintained by the serving BS and that the mobility restriction policy for the MS is suspended, the serving BS sends a Handover Request (HO_Req) message to one or more target BSs. The HO_Req message carries the MS context. The MS context includes mobility restriction parameters. The ES bit has been set to a specific value so that the target BS suspends executing the mobility restriction policy for the MS and finishes the handover process.

Step 703: Optionally, the target BS may obtain the authorization key context of the MS by sending a context request to the authenticator of the MS. This step is omissible if the serving BS has requested the authorization key context of the MS for the target BS from the authenticator beforehand, and the context is carried in the HO_Req message to the target BS, or, if the target BS decides to request the authorization key context from the authenticator at the time of accessing the local BS.

Step 704: Optionally, if the network supports a data path pre-registration mechanism, the target BS may initiate preliminary setup of a data path to an anchor Data Path Function (DPF).

Step 705: The target BS sends a Handover Response (HO_Rsp) message to the serving BS in response to the HO_Req.

Step 706: The serving BS sends a BS handover response (MOB_BSHO_RSP) message to the MS. The MOB_BSHO_RSP message may carry identifiers of one or more target BSs selected by the network for the MS.

Step 707: The serving BS sends a Handover Acknowledgement (HO_Ack) message to the target BS, indicating that the serving BS has received the HO_Rsp message.

The MS implements handover according to the prior art.

This embodiment deals with handover of the MS in the process of using the emergency service. For the processing for the MS after completion of the handover, see the embodiments described above.

Through the method disclosed in this embodiment, the serving BS of the MS may send the MS context with the set ES bit to the target BS. In this way, the execution of the mobility restriction policy of the MS can be suspended at the target BS, and the MS can be handed over between the BSs in the process of using the emergency service, thus keeping continuity of the emergency service.

An apparatus for managing emergency services of a mobility-restricted MS is provided in an embodiment of the present invention to implement the method disclosed in the foregoing embodiments.

Figure 8:
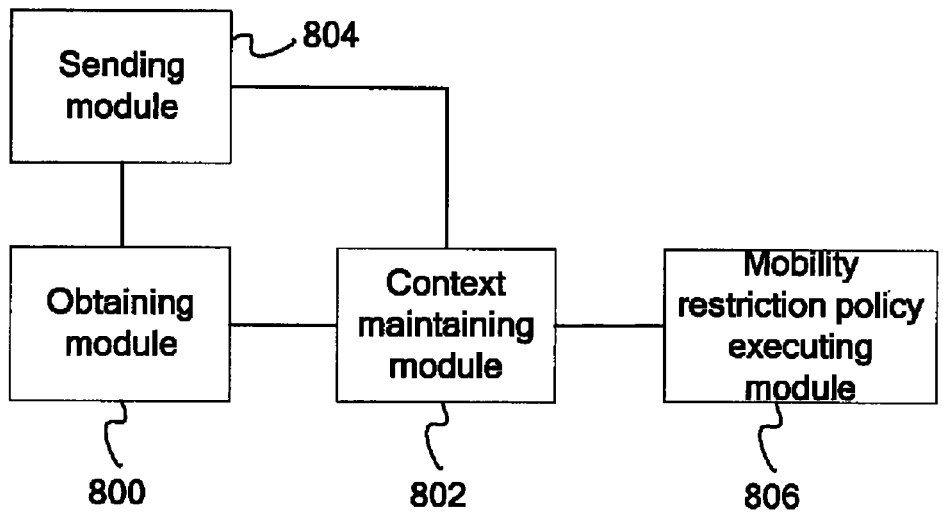
FIG. 8 is a schematic structural diagram of an apparatus for managing emergency services of a mobility-restricted MS according to an embodiment of the present invention.

As shown in FIG. 8, the apparatus includes a receiving module 800, a context maintaining module 802, and a sending module 804.

The receiving module 800 is configured to obtain emergency service information or an ES_Flag, where the emergency service information or the ES_Flag serves as an indication of providing emergency services for the mobility-restricted MS.

The context maintaining module 802 is configured to construct an emergency service indicator in a context of the MS according to the emergency service information or the ES_Flag received by the receiving module 800. Specifically, the context maintaining module 802 constructs an emergency service indicator in the maintained MS context according to the emergency service information if the information obtained by the receiving module 800 is the emergency service information, or according to the ES_Flag if the information obtained by the receiving module 800 is the ES_Flag.

The sending module 804 is configured to: send a Path_Reg_Req to the BS or send an RR_Req to the S-SFA, where the Path_Reg_Req or RR_Req carries the ES_Flag if what is obtained by the obtaining module 800 is the ES_Flag; or, if the emergency service information is obtained by the obtaining module 800, generate an ES_Flag according to the emergency service indicator constructed by the context maintaining module 802 or the emergency service information, and add the ES_Flag into the Path_Reg_Req or RR_Req.

Optionally, the apparatus further includes:

a mobility restriction policy executing module 806, configured to suspend execution of a mobility restriction policy for the MS according to the emergency service indicator in the MS context in the context maintaining module 802.

The apparatus may be an ASN GW that includes an A-SFA. In this case, the receiving module 800 is configured to receive an indication that carries the ES_Flag, where the indication may be an indication of initiating setup of an emergency service bearer path or a service flow, or an Access Accept indication, or a PCC indication. The mobility restriction policy executing module 806 may be an authenticator. Alternatively, the apparatus may also be an ASN GW that includes an S-SFA. In this case, the receiving module 800 is configured to receive the RR_Req that carries an ES_Flag.

Through the apparatus disclosed in this embodiment, when the MS initiates an emergency service, the emergency service information or the ES_Flag received by the receiving module 800 indicates that the service is an emergency service, the context maintaining module 802 of the MS sets an emergency service indicator in the corresponding MS context, and the mobility restriction policy executing module 806 suspends execution of the mobility restriction policy for the MS and offers the emergency service to the MS.

A BS is provided in an embodiment of the present invention to manage emergency services of a mobility-restricted MS and implement the method disclosed in the foregoing embodiments.

Figure 9:
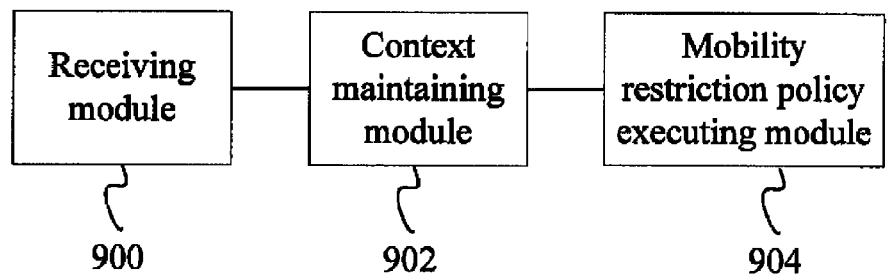
FIG. 9 is a schematic structure diagram of a BS disclosed according to an embodiment of the present invention.

As shown in FIG. 9, the BS includes a receiving module 900, a context maintaining module 902, and a mobility restriction policy executing module 904.

The receiving module 900 is configured to receive an ES_Flag from an ASN GW. Specifically, the receiving module 900 may receive a Path_Reg_Req from an A-SFA or an S-SFA located at the ASN GW. The Path_Reg_Req carries the ES_Flag.

The context maintaining module 902 is configured to construct an emergency service indicator in a context of an MS according to the emergency service information or the ES_Flag received by the receiving module 900.

The mobility restriction policy executing module 904 is configured to suspend execution of a mobility restriction policy for the MS according to the emergency service indicator in the MS context in the context maintaining module 902.

Through the BS disclosed in this embodiment, when the MS initiates an emergency service, the ES_Flag received by the receiving module 900 indicates that the service is an emergency service, the context maintaining module 902 of the MS sets an emergency service indicator in the corresponding MS context, and the mobility restriction policy executing module 904 suspends execution of the mobility restriction policy for the MS and offers the emergency service to the MS.

A system for managing emergency services of a mobility-restricted MS is provided in an embodiment of the present invention to implement the method disclosed in the foregoing embodiments.

Figure 10:
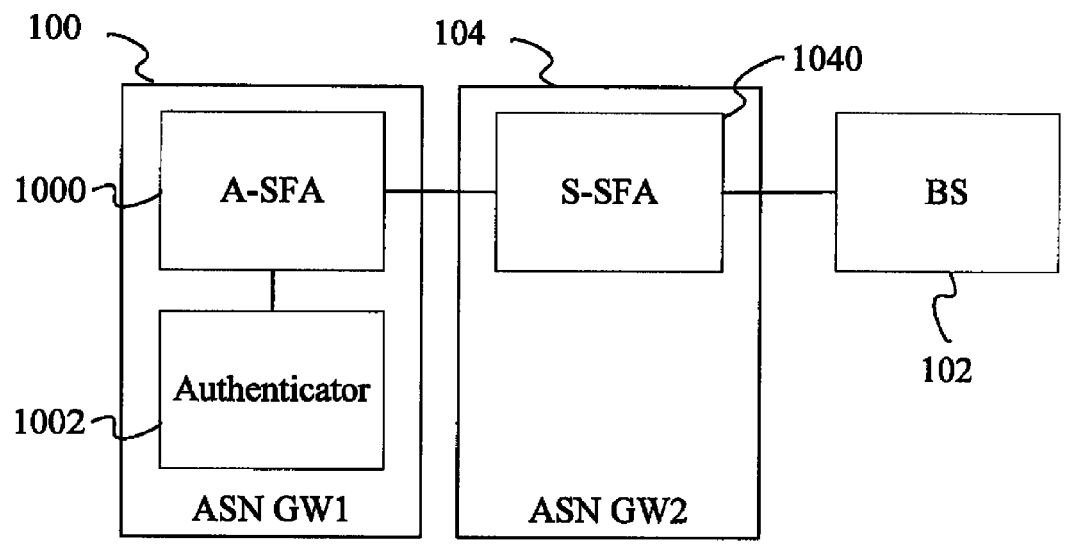
FIG. 10 is a schematic diagram of composition of a system for managing emergency services of a mobility-restricted MS according to an embodiment of the present invention.

As shown in FIG. 10, the system includes an ASN GW 100 and a BS 102 connected to the ASN GW 100. The ASN GW 100 includes an A-SFA 1000, configured to: obtain emergency service information or an ES_Flag which indicates that an emergency service is provided for the mobility-restricted MS; construct, according to the emergency service information or the ES_Flag, an emergency service indicator in the MS context maintained by the ASN GW 100; send a Path_Reg_Req to the BS 102, where the Path_Reg_Req carries the ES_Flag if what is obtained is the ES_Flag; or, if the emergency service information is obtained, generate an ES_Flag according to the emergency service indicator or emergency service information, and add the generated ES_Flag into the Path_Reg_Req.

The BS 102 is configured to construct, according to the ES_Flag from the ASN GW 100, an emergency service indicator in the MS context maintained by the BS 102, and suspend execution of a mobility restriction policy for the MS.

Optionally, the ASN GW 100 further includes an authenticator 1002 located with the A-SFA 1000, and the authenticator 1002 is configured to suspend executing the mobility restriction policy for the MS according to the emergency service indicator in the MS context on the A-SFA 1000.

Optionally, the system further includes an ASN GW 104, which includes an S-SFA 1040 connected to the A-SFA 1000 on the ASN GW 100 and to the BS 102. The A-SFA 1000 is further configured to: send an RR_Req to the S-SFA 1040, where the RR_Req carries the ES_Flag if what is obtained is the ES_Flag; or, if the emergency service information is obtained, generate an ES_Flag according to the emergency service indicator or emergency service information, and add the ES_Flag into the Path_Reg_Req. The S-SFA 1040 is configured to: receive the RR_Req from the A-SFA 1000, construct, according to the ES_Flag carried in the RR_Req, an emergency service indicator in the MS context maintained by the S-SFA 1040, suspend executing the mobility restriction policy for the MS, and send the Path_Reg_Req to the BS 102, where the Path_Reg_Req carries the ES_Flag. The BS 102 is further configured to construct, according to the ES_Flag from the S-SFA of the ASN GW 102, an emergency service indicator in the MS context maintained by the BS 102 and suspend execution of a mobility restriction policy for the MS.

Through the system disclosed in this embodiment, when the MS initiates an emergency service, the A-SFA 1000 can identify the service as an emergency service according to the obtained ES_Flag, and construct an emergency service indicator in the MS context maintained by the A-SFA 1000. Further, the authenticator 1002 located with the A-SFA 1000 suspends executing the mobility restriction policy for the MS according to the emergency service indicator; the A-SFA 1000 sends the ES_Flag to the S-SFA 1040 and/or BS 102, and therefore, the S-SFA 1040 and the BS 102 construct an emergency service indicator in the MS context maintained by the S-SFA 1040 and the BS 102 respectively, suspend executing the mobility restriction policy for the MS, and offer the emergency service for the MS.

Through the method, apparatus, and system disclosed herein, when the MS initiates an emergency service, the A-SFA can identify the service as an emergency service according to the obtained ES_Flag, and construct an emergency service indicator in the MS context maintained by the A-SFA; the authenticator located with the A-SFA suspends executing the mobility restriction policy for the MS according to the emergency service indicator; the A-SFA sends the ES_Flag to the S-SFA and BS, and therefore, the S-SFA and the BS construct an emergency service indicator in the MS context maintained by the S-SFA and the BS respectively, suspend executing the mobility restriction policy for the MS, and offer the emergency service to the MS. Further, the MS can be handed over between BSs in the process of using the emergency service. Further, after the MS finishes using the emergency service, the MS may clear the emergency service indicator in the MS context to resume executing the mobility restriction policy for the MS, and initiate a process of detaching the MS from the network when the network discovers that the MS is outside the network access area.

After reading the foregoing embodiments, those skilled in the art are clearly aware that the embodiments of the present invention may be implemented through hardware, or, preferably in most circumstances, through software in addition to a necessary universal hardware platform. Therefore, the technical solution under the present invention or its novelty over the prior art may be embodied in a software product. The software product is stored in computer-readable storage media such as a floppy disk, a hard disk or a Compact Disk-Read Only Memory (CD-ROM), and incorporates several indications for instructing a computer device (for example, a personal computer, a server, or a network device) to execute the method specified in any embodiment of the present invention.

The above embodiments are merely provided for describing the technical solution of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. A method for managing emergency services of a mobility-restricted Mobile Station (MS), comprising:
   obtaining, by an Anchor-Service Flow Authorization entity (A-SFA), emergency service information or an Emergency Service Flag (ES_Flag), wherein the emergency service information or the ES_Flag serves as an indication of providing an emergency service for the mobility-restricted MS;
   constructing, according to the emergency service information or the ES_Flag, an emergency service indicator in an MS context maintained by the A-SFA; and
   sending a Path Registration Request (Path_Reg_Req) to a Base Station (BS), wherein the Path_Reg_Req carries the ES_Flag if what is obtained is the ES_Flag; or
   if what is obtained is the emergency service information, generating an ES_Flag according to the emergency service indicator or the emergency service information, and adding the generated ES_Flag into the Path_Reg_Req;
   wherein the obtaining of the emergency service information or the ES_Flag further comprises one or more of:
   receiving an indication of initiating setup of an emergency service bearer path and a service flow, wherein the indication is sent by a Voice Service Provider (VSP) and carries the emergency service information; or
   receiving an Access Accept indication from an Authentication, Authorization and Accounting (AAA) server, wherein the Access Accept indication carries the ES_Flag; or
   receiving a Policy and Charging Control (PCC) indication from a Policy Control and Charging Rules Function (PCRF), wherein the PCC indication carries the ES_Flag.

2. The method according to claim 1, wherein:
   if the A-SFA receives the indication of initiating setup of an emergency service bearer path and a service flow from the VSP, before the Path_Reg_Req is sent to the BS, the method further comprises:
   sending, by the A-SFA, a Resource Reservation Request (RR_Req) to a Serving-Service Flow Authorization entity (S-SFA), wherein the RR_Req carries the ES_Flag which is generated according to the emergency service indicator or emergency service information; and
   constructing, by the S-SFA and according to the ES_Flag, an emergency service indicator in an MS context maintained by the S-SFA;
   the process of sending the Path_Reg_Req to the BS comprises: sending, by the S-SFA, the Path_Reg_Req to the BS, wherein the Path_Reg_Req carries the ES_Flag;
   afterward, the method further comprises:
   constructing, by the BS and according to the ES_Flag, an emergency service indicator in an MS context maintained by the BS.

3. The method according to claim 2, further comprising:
   after the A-SFA receives a Resource Reservation Response (RR_Rsp) from the S-SFA,
   suspending, by an authenticator located with the A-SFA, execution of a mobility restriction policy for the MS;
   sending, by the A-SFA, a Resource Reservation Acknowledgement (RR_Ack) to the S-SFA;
   suspending, by the S-SFA, execution of the mobility restriction policy for the MS and sending a Path Registration Acknowledgement (Path_Reg_Ack) to the BS; and
   suspending, by the BS, execution of the mobility restriction policy for the MS.

4. The method according to claim 1, wherein:
   if the A-SFA receives the indication of initiating setup of an emergency service bearer path and a service flow from the VSP, before the Path_Reg_Req is sent to the BS, the method further comprises:
   suspending, by an authenticator located with the A-SFA, execution of a mobility restriction policy for the MS;
   sending, by the A-SFA, a Resource Reservation Request (RR_Req) to a Serving-Service Flow Authorization entity (S-SFA), wherein the RR_Req carries the ES_Flag which is generated according to the emergency service indicator or emergency service information; and constructing, by the S-SFA, according to the ES_Flag, an emergency service indicator in an MS context maintained by the S-SFA, and suspending execution of a mobility restriction policy for the MS;

the process of sending the Path_Reg_Req to the BS comprises: sending, by the S-SFA, the Path_Reg_Req to the BS, wherein the Path_Reg_Req carries the ES_Flag;

afterward, the method further comprises:

constructing, by the BS, according to the ES_Flag, an emergency service indicator in an MS context maintained by the BS, and suspending execution of the mobility restriction policy for the MS.

5. The method according to claim 3, wherein after the MS finishes using the emergency service, the method further comprises:

clearing, by the A-SFA, the ES_Flag in the MS context maintained by the A-SFA after receiving the RR_Rsp from the S-SFA;

resuming, by the authenticator located with the A-SFA, execution of the mobility restriction policy for the MS;

sending, by the A-SFA, the RR_Ack to the S-SFA to confirm deletion of the service flow;

clearing, by the S-SFA, the emergency service indicator in the MS context maintained by the S-SFA, resuming execution of the mobility restriction policy for the MS, and sending a Path Deregistration Acknowledgement (Path_DeReg_Ack) to the BS; and clearing, by the BS, the emergency service indicator in the MS context maintained by the BS, and resuming execution of the mobility restriction policy for the MS.

6. The method according to claim 3, wherein:

after the MS finishes using the emergency service, the method further comprises:

clearing, by the A-SFA, the emergency service indicator in the MS context maintained by the A-SFA, sending the RR_Req to the S-SFA, and initiating a process of deleting the service flow that bears the emergency service;

resuming, by the authenticator located with the A-SFA, execution of the mobility restriction policy for the MS;

sending, by the S-SFA, a Path Deregistration Request (Path_DeReg_Req) to the BS, clearing the emergency service indicator in the MS context maintained by the S-SFA, and resuming execution of the mobility restriction policy for the MS; and clearing, by the BS, the emergency service indicator in the MS context maintained by the BS, and resuming execution of the mobility restriction policy for the MS.

7. The method according to claim 3, wherein:

if the MS is handed over in the process of using the emergency service, the method further comprises:

receiving, by a serving BS of the MS, an MS handover request (MOB_MSHO_REQ) message from the MS; and sending, by the serving BS of the MS, a Handover Request (HO_Req) message to a target BS, wherein the HO_Req carries an MS context, and the MS context comprises mobility restriction parameters and the emergency service indicator to enable the target BS to suspend executing the mobility restriction policy for the MS.

8. The method according to claim 1, wherein:

if the A-SFA receives an Access Accept indication that carries the ES_Flag, before the A-SFA receives the Access Accept indication, the method further comprises:

using, by the MS, a Network Access Identifier (NAI) to indicate that authentication is intended for the emergency service in the process of access authentication between the MS and the AAA server; and performing, by the AAA server, the authentication process according to its emergency service policy, and generating the ES_Flag according to the NAI.

9. The method according to claim 1, wherein:

if the A-SFA receives a PCC indication, before the A-SFA receives the PCC indication, the method further comprises:

receiving, by a Proxy-Call Session Control Function (P-CSCF), a Session Initiation Protocol (SIP) INVITE message from the MS, wherein the SIP INVITE message carries a Uniform Resource Identifier (URI) indicating that the service is an emergency service; and generating, by the P-CSCF, the ES_Flag according to the URI, and sending the ES_Flag to the PCRF.

10. The method according to claim 9, wherein:

before the P-CSCF receives the SIP INVITE message, the method further comprises:

using, by the MS, a Network Access Identifier (NAI) to indicate that authentication is intended for the emergency service in the process of access authentication between the MS and the AAA server; and performing, by the AAA server, the authentication process according to its emergency service policy, and sending an Access Accept indication to the A-SFA.

11. The method according to claim 8, wherein:

before sending the Path_Reg_Req to the BS, the method further comprises:

suspending, by an authenticator located with the A-SFA, execution of a mobility restriction policy for the MS;

sending, by the A-SFA, a Resource Reservation Request (RR_Req) to a Serving-Service Flow Authorization entity (S-SFA), wherein the RR_Req carries the ES_Flag; and constructing, by the S-SFA, according to the ES_Flag, an emergency service indicator in an MS context maintained by the S-SFA, and suspending execution of the mobility restriction policy for the MS;

the process of sending the Path_Reg_Req to the BS comprises: sending, by the S-SFA, the Path_Reg_Req to the BS, wherein the Path_Reg_Req carries the ES_Flag;

afterward, the method further comprises:

constructing, by the BS, according to the ES_Flag, an emergency service indicator in an MS context maintained by the BS, and suspending execution of the mobility restriction policy for the MS.

12. The method according to claim 11, wherein:

after the MS finishes using the emergency service, the method further comprises:

clearing, by the A-SFA, the emergency service indicator in the MS context maintained by the A-SFA, sending the RR_Req to the S-SFA, and initiating a process of deleting the service flow that bears the emergency service;

resuming, by the authenticator located with the A-SFA, execution of the mobility restriction policy for the MS;

sending, by the S-SFA, a Path Deregistration Request (Path_DeReg_Req) to the BS, clearing the emergency service indicator in the MS context maintained by the S-SFA, and resuming execution of the mobility restriction policy for the MS; and clearing, by the BS, the emergency service indicator in the MS context maintained by the BS, and resuming execution of the mobility restriction policy for the MS.

13. The method according to claim 11, wherein:
if the MS is handed over in the process of using the emergency service, the method further comprises:
receiving, by a serving BS of the MS, an MS handover request (MOB_MSHO_REQ) message from the MS; and
sending, by the serving BS of the MS, a Handover Request (HO_Req) message to a target BS, wherein the HO_Req carries an MS context, and the MS context comprises mobility restriction parameters and the emergency service indicator to enable the target BS to suspend executing the mobility restriction policy for the MS.

14. An apparatus for managing emergency services of a mobility-restricted Mobile Station (MS), comprising:
an obtaining module, configured to obtain emergency service information or an Emergency Service Flag (ES_Flag), wherein the emergency service information or the ES_Flag serves as an indication of rovidin an emer enc service for the mobility- restricted MS;
a context maintaining module, configured to construct an emergency service indicator in an MS context according to the emergency service information or the ES_Flag obtained by the obtaining module; and
a sending module, configured to: send a Path Registration Request (Path_Reg_Req) to a Base Station (BS) or send a Resource Reservation Request (RR_Req) to a Serving-Service Flow Authorization entity (S-SFA), wherein the Path_Reg_Req or RR_Req carries the ES_Flag if what is obtained by the obtaining module is the ES_Flag; or, if what is obtained by the obtaining module is the emergency service information, generate an ES_Flag according to the emergency service indicator constructed by the context maintaining module or the emergency service information obtained by the obtaining module, and add the generated ES_Flag into the Path_Reg_Req or RR_Req;
wherein the obtainment of the emergency service information or the ES_Flag further comprises one or more of:
receive an indication of initiating setup of an emergency service bearer path and a service flow, wherein the indication is sent by a Voice Service Provider (VSP) and carries the emergency service information; or
receive an Access Accept indication from an Authentication, Authorization and Accounting (AAA) server, wherein the Access Accept indication carries the ES_Flag; or
receive a Policy and Charging Control (PCC) indication from a Policy Control and Charging Rules Function (PCRF), wherein the PCC indication carries the ES_Flag.

15. The apparatus according to claim 14, further comprising:
a mobility restriction policy executing module, configured to suspend execution of a mobility restriction policy for the MS according to the emergency service indicator in the MS context in the context maintaining module.

16. A system for managing emergency services of a mobility-restricted Mobile Station (MS), comprising a first Access Service Network (ASN) Gateway (GW) and a Base Station (BS) connected to the ASN GW, wherein:
the first ASN GW comprises an Anchor-Service Flow Authorization entity (A-SFA) which is configured to:
obtain emergency service information or an Emergency Service Flag (ES_Flag), wherein the emergency service information or the ES_Flag serves as an indication of providing an emergency service for the mobility-restricted MS;
construct, according to the emergency service information or the ES_Flag, an emergency service indicator in an MS context maintained by the A-SFA; and
send a Path Registration Request (Path_Reg_Req) to the BS, wherein the Path_Reg_Req carries the ES_Flag if what is obtained is the ES_Flag; or, if what is obtained is the emergency service information, generate an ES_Flag according to the emergency service indicator or the emergency service information, and add the generated ES_Flag into the Path_Reg_Req;
the BS is configured to construct, according to the ES_Flag from the first ASN GW, an emergency service indicator in an MS context maintained by the BS, and suspend execution of a mobility restriction policy for the MS;
wherein the obtainment, by the A-SFA, of the emergency service information or the ES Flag further comprises one or more of:
receive an indication of initiating setup of an emergency service bearer path and a service flow, wherein the indication is sent by a Voice Service Provider (VSP) and carries the emergency service information; or
receive an Access Accept indication from an Authentication, Authorization and Accounting (AAA) server, wherein the Access Accept indication carries the ES_Flag; or
receive a Policy and Charging Control (PCC) indication from a Policy Control and Charging Rules Function (PCRF), wherein the PCC indication carries the ES_Flag.

17. The system according to claim 16, wherein:
the first ASN GW further comprises an authenticator located with the A-SFA, and the authenticator is configured to suspend executing the mobility restriction policy for the MS according to the emergency service indicator in the MS context on the A-SFA.

18. The system according to claim 16, wherein:
the system further comprises a second ASN GW, wherein the second ASN GW comprises a Serving-Service Flow Authorization entity (S-SFA) connected, in a communication-capable way, to the A-SFA on the first ASN GW and to the BS, wherein:
the A-SFA of the first ASN GW is further configured to: send a Resource Reservation Request (RR_Req) to the S-SFA of the second ASN GW, wherein the RR_Req carries the ES_Flag if what is obtained is the ES_Flag; or, if what is obtained is the emergency service information, generate an ES_Flag according to the emergency service indicator or emergency service information, and add the ES_Flag into the Path_Reg_Req;
the S-SFA of the second ASN GW is configured to: receive the RR_Req from the A-SFA of the first ASN GW, construct, according to the ES_Flag carried in the RR_Req, an emergency service indicator in an MS context maintained by the S-SFA, suspend executing the mobility restriction policy for the MS, and send the Path_Reg_Req to the BS, wherein the Path_Reg_Req carries the ES_Flag; and
the BS is configured to construct, according to the ES_Flag from the S-SFA of the second ASN GW, an emergency service indicator in the MS context maintained by the BS, and suspend execution of the mobility restriction policy for the MS.

* * * * *

UNITED STATES PATENT AND TRADEMARK OFFICE
CERTIFICATE OF CORRECTION

PATENT NO.         : 8,229,391 B2
APPLICATION NO.    : 13/114406
DATED              : July 24, 2012
INVENTOR(S)        : Liang et al.

It is certified that error appears in the above-identified patent and that said Letters Patent is hereby corrected as shown below:

In the Claims

Column 19, Lines 18-19, in Claim 14, delete "rovidin an emer enc service for the mobility- restricted MS;" and insert -- providing an emergency service for the mobility-restricted MS; --, therefor.

Signed and Sealed this
Twenty-ninth Day of July, 2014

Michelle K. Lee
*Deputy Director of the United States Patent and Trademark Office*